US009637157B2

(12) United States Patent
Bless

(10) Patent No.: US 9,637,157 B2
(45) Date of Patent: May 2, 2017

(54) STEERING SHAFT COMPONENT, STEERING SHAFT AND PRODUCTION METHOD

(76) Inventor: Werner M. Bless, Ruti (CH)

(*) Notice: Subject to any disclaimer, the term of this patent is extended or adjusted under 35 U.S.C. 154(b) by 394 days.

(21) Appl. No.: 13/384,964

(22) PCT Filed: Jun. 23, 2010

(86) PCT No.: PCT/EP2010/058921
§ 371 (c)(1),
(2), (4) Date: Jan. 19, 2012

(87) PCT Pub. No.: WO2010/149707
PCT Pub. Date: Dec. 29, 2010

(65) Prior Publication Data
US 2012/0118099 A1 May 17, 2012

(30) Foreign Application Priority Data
Jun. 23, 2009 (DE) .......... 10 2009 030 238
Jul. 14, 2009 (DE) .......... 10 2009 032 991

(51) Int. Cl.
B62D 1/18 (2006.01)
B21D 51/16 (2006.01)
B62D 1/16 (2006.01)
B62D 5/083 (2006.01)
B62D 6/10 (2006.01)
G01L 5/22 (2006.01)

(52) U.S. Cl.
CPC .......... B62D 1/16 (2013.01); B62D 5/0837 (2013.01); B62D 6/10 (2013.01); G01L 5/221 (2013.01); Y10T 29/49622 (2015.01)

(58) Field of Classification Search
CPC .............................. B62D 5/0835; B62D 3/58
USPC ......... 74/492; 180/440, 446, 429; 91/375 A, 91/375 R; 464/86, 78
See application file for complete search history.

(56) References Cited

U.S. PATENT DOCUMENTS

| 1,315,782 A | * | 9/1919 | Leggett | F16D 3/72 464/183 |
| 1,612,321 A | * | 12/1926 | Soderberg | 464/78 |
| 2,343,079 A | * | 2/1944 | Pickwell | 464/60 |
| 2,926,541 A | * | 3/1960 | Adams | 74/388 R |
| 3,273,601 A | * | 9/1966 | Gain | 138/166 |
| 3,420,582 A | * | 1/1969 | Shelley | F01D 25/28 267/160 |

(Continued)

FOREIGN PATENT DOCUMENTS

AT 0 07 835 T 6/1984
DE 31 10 334 A1 2/1982
(Continued)

Primary Examiner — Terence Boes
(74) Attorney, Agent, or Firm — Fox Rothschild LLP; Robert J. Sacco; Carol E. Thorstad-Forsyth

(57) ABSTRACT

A steering shaft component (10) comprises a first and a second steering shaft section (12, 14) and at least a first bending section (28x) extending between the first and the second steering shaft sections (12, 14). The first bending section (28x) is formed integrally with at least one of the steering shaft sections (12, 14), but has a different cross section from this steering shaft section (12, 14). Furthermore, a mechanical stop for limiting the maximum angle of rotation of the two steering shaft sections relative to each other is provided.

19 Claims, 14 Drawing Sheets

(56) References Cited

U.S. PATENT DOCUMENTS

| | | | | |
|---|---|---|---|---|
| 3,597,938 A | * | 8/1971 | Hellen | F16D 3/005 403/291 |
| 3,677,033 A | * | 7/1972 | Kneeland | F16D 3/50 464/30 |
| 4,671,780 A | * | 6/1987 | Weir | 464/85 |
| 4,676,331 A | | 6/1987 | Iwaki et al. | |
| 5,046,372 A | * | 9/1991 | Taniguchi | G01L 3/109 73/862.335 |
| 5,195,383 A | | 3/1993 | Tanaka et al. | |
| 5,239,888 A | * | 8/1993 | Sevault et al. | 74/492 |
| 5,975,136 A | * | 11/1999 | Heitzer | 137/625.21 |
| 6,223,607 B1 | | 5/2001 | Yasui | |
| 6,517,113 B1 | | 2/2003 | Nicot | |
| 6,619,421 B2 | * | 9/2003 | Tanioka | B62D 5/0403 180/444 |
| 6,782,966 B2 | * | 8/2004 | Sahr | B62D 5/22 180/428 |
| 7,484,759 B2 | * | 2/2009 | Pattok et al. | 280/771 |
| 8,376,865 B2 | * | 2/2013 | Forster et al. | 464/78 |

FOREIGN PATENT DOCUMENTS

| | | |
|---|---|---|
| DE | 40 38 808 A1 | 6/1991 |
| DE | 195 17 621 A1 | 11/1995 |
| DE | 199 52 217 A1 | 5/2001 |
| DE | 10120580 A1 | 11/2002 |
| DE | 10 2006 034 143 A1 | 1/2008 |
| DE | 10 2007 032 907 A1 | 5/2008 |
| DE | 102007047827 A1 | 5/2009 |
| DE | 10 2008 032 898 A1 | 1/2010 |
| EP | 0502761 A1 | 9/1992 |
| JP | 2005 247255 A | 9/2005 |
| WO | 97/09221 A1 | 3/1997 |
| WO | WO-2010/007069 A1 | 1/2010 |

* cited by examiner

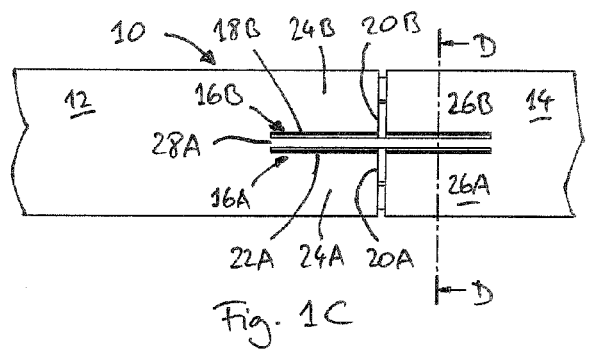
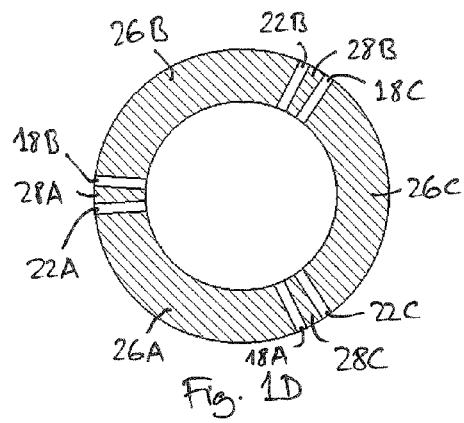
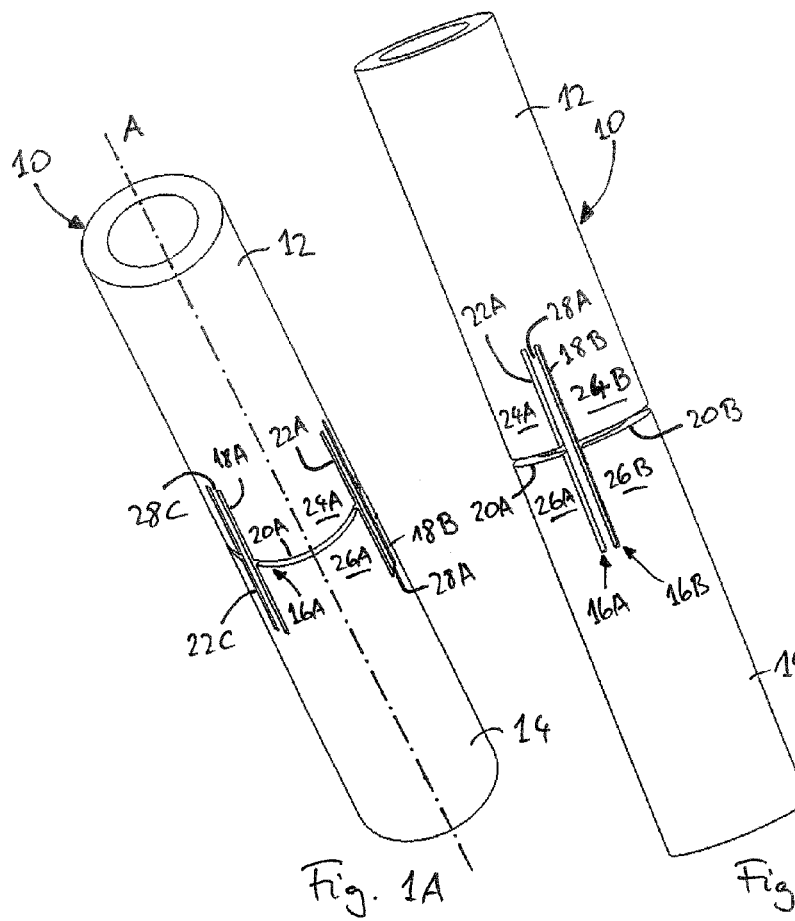

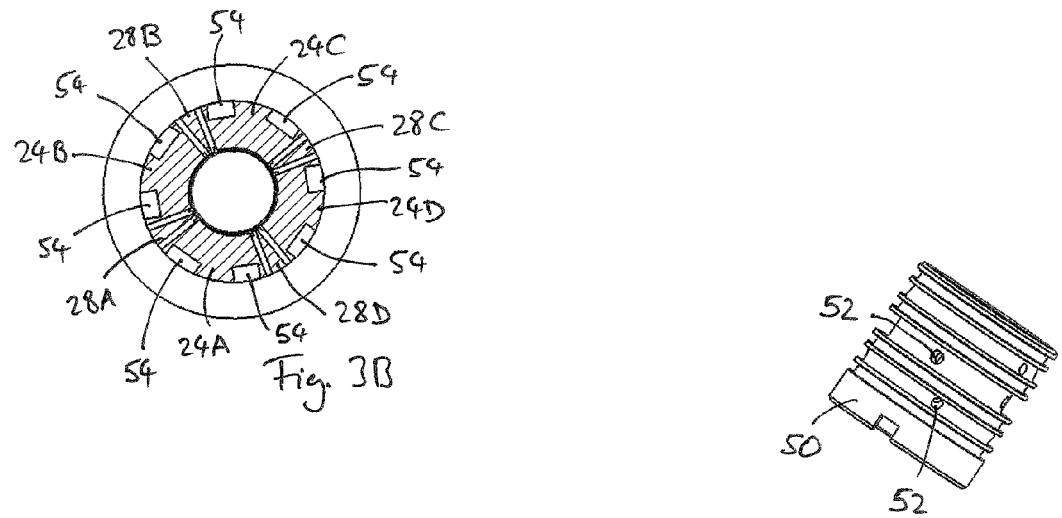
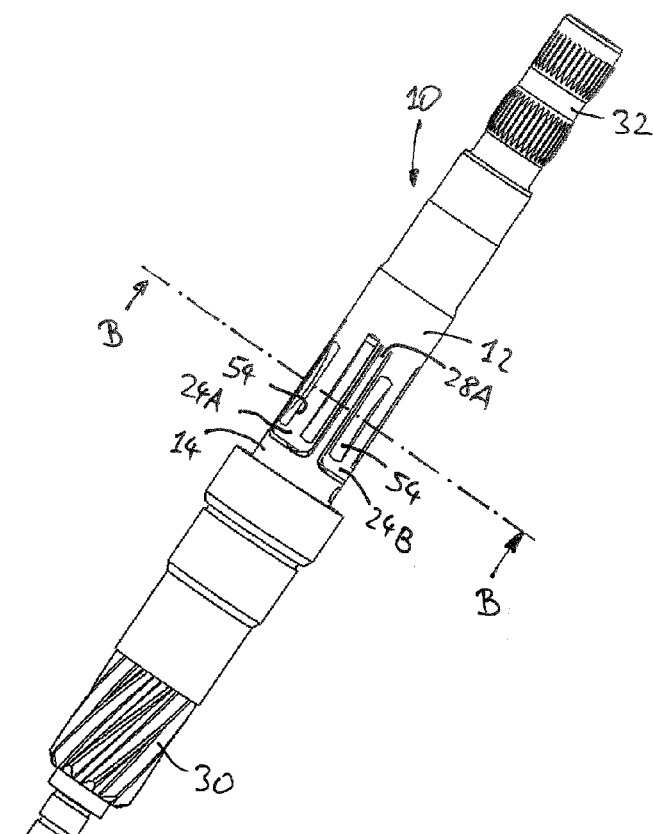
Fig. 3B
Fig. 3A

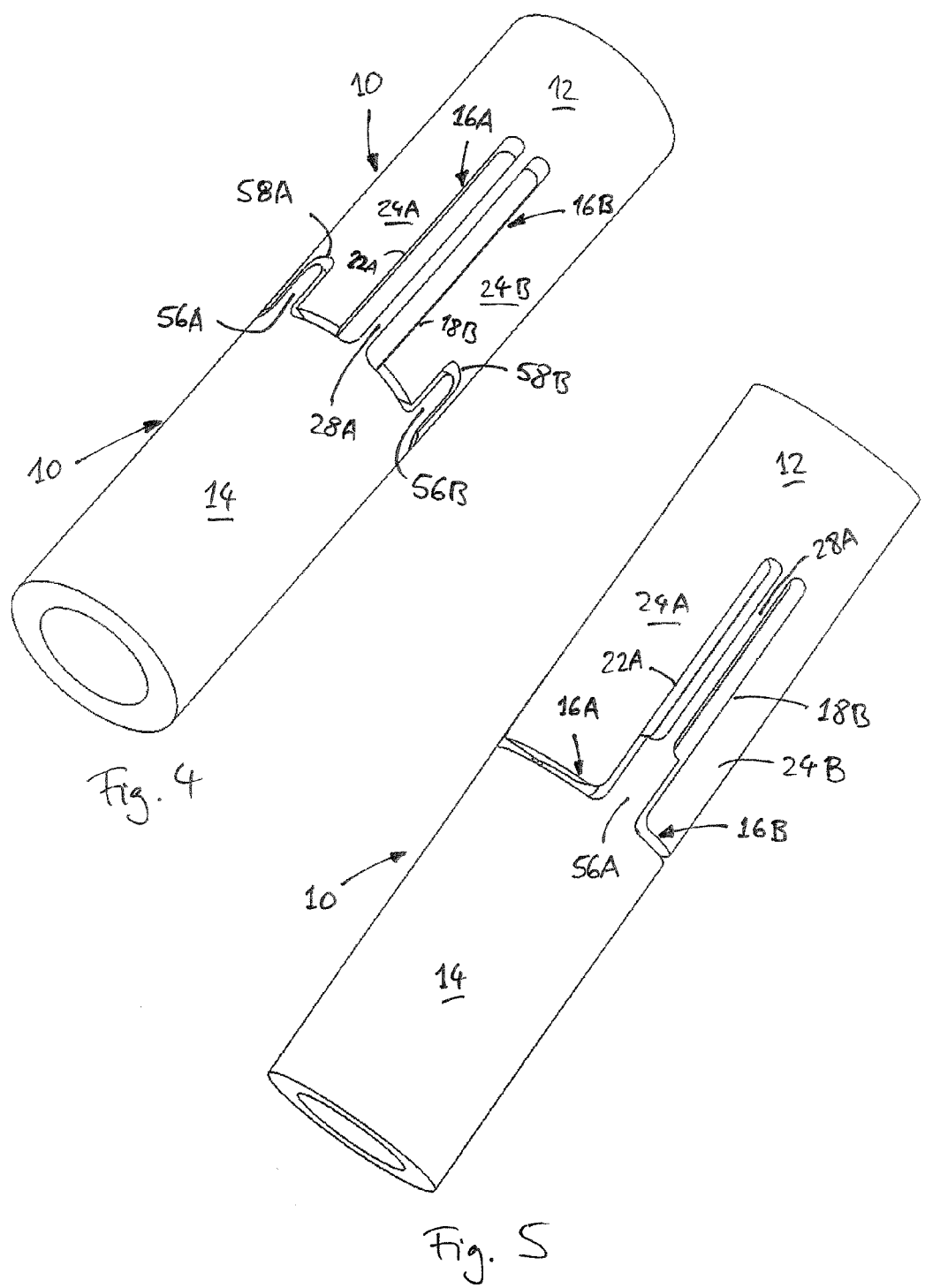

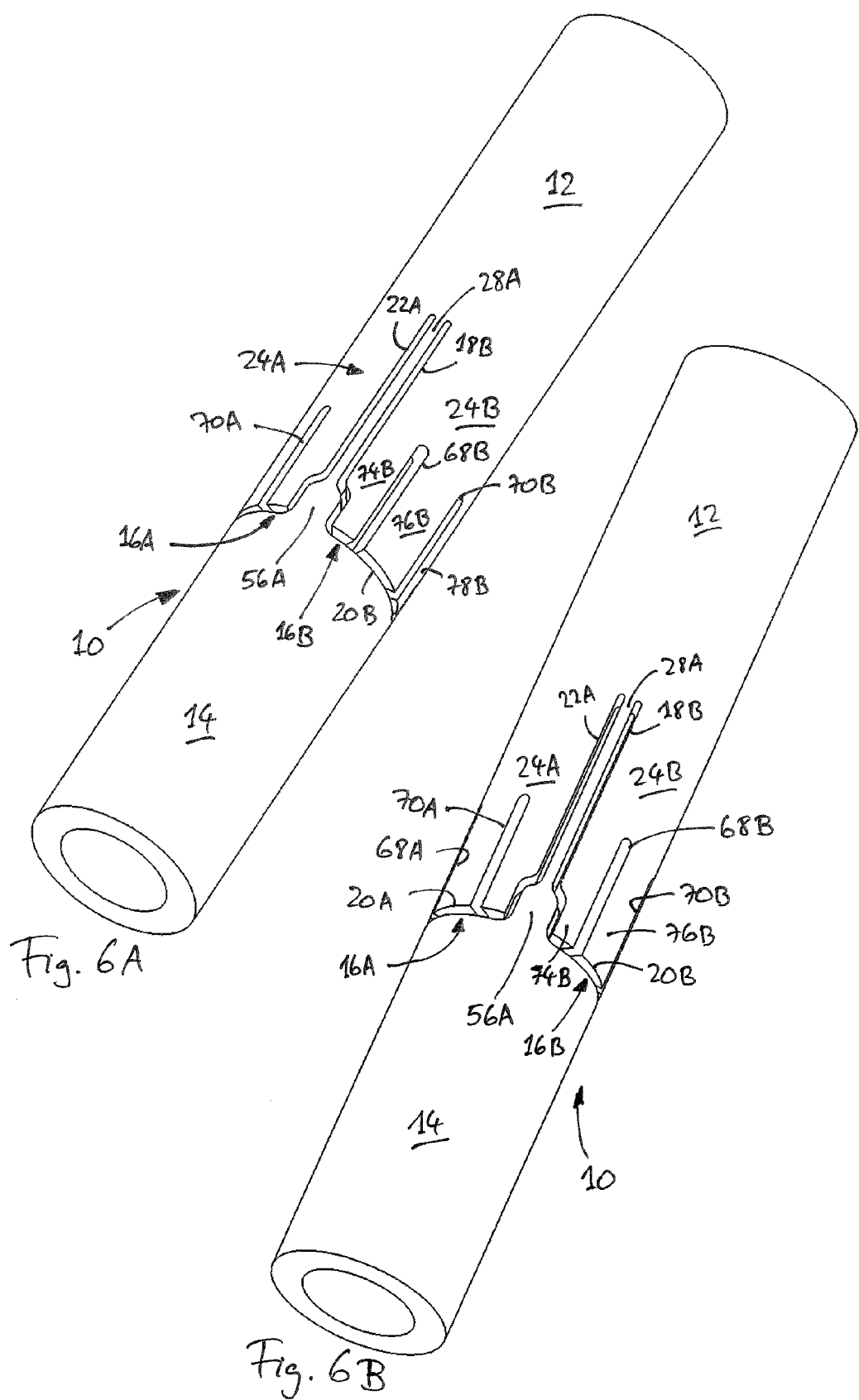

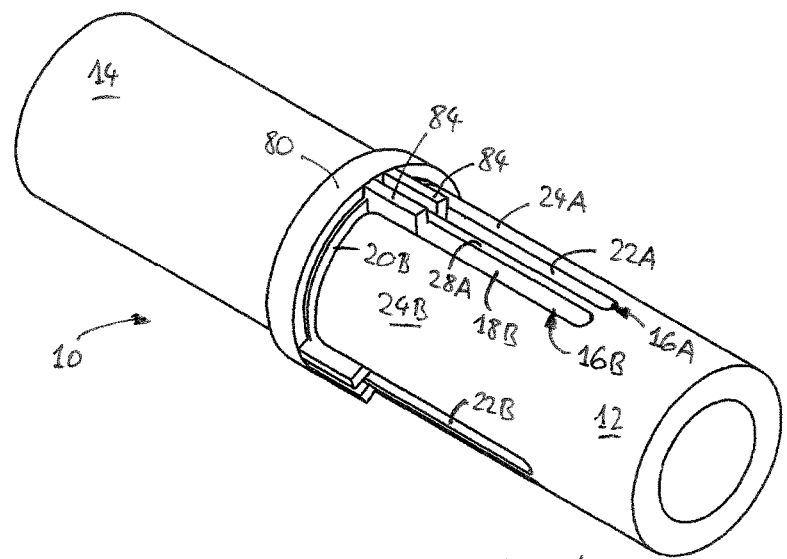
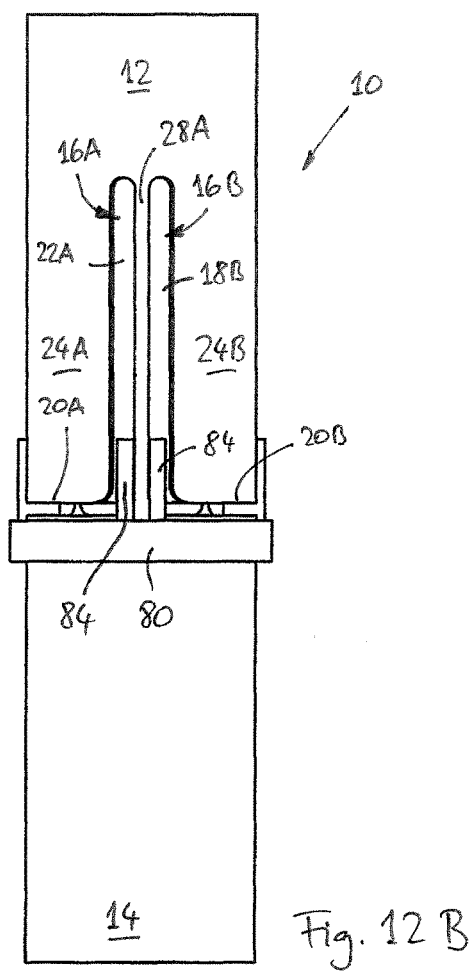
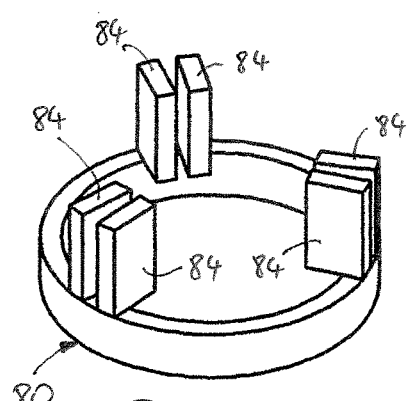
Fig. 12A
Fig. 12C
Fig. 12B

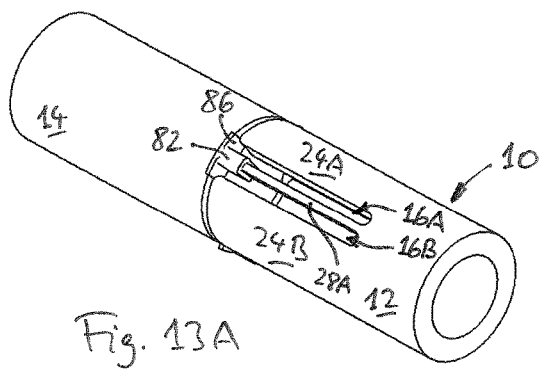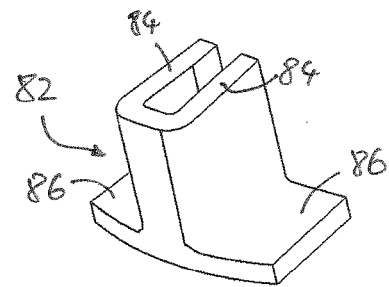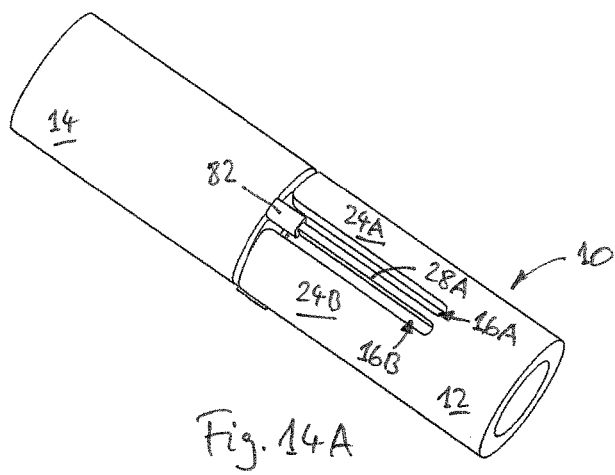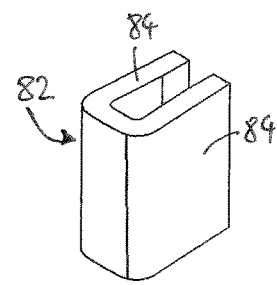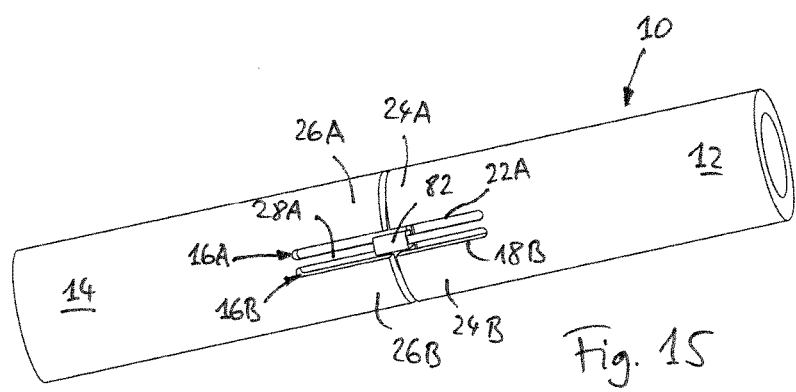

STEERING SHAFT COMPONENT, STEERING SHAFT AND PRODUCTION METHOD

CROSS REFERENCE TO RELATED APPLICATIONS

The present application is the U.S. National Phase of International Patent Application Serial No. PCT/EP2010/058921, filed Jun. 23, 2010, which claims priority to German Patent Application No. 102009030238.7, filed Jun. 23, 2009, and to German Patent Application No. 102009032991.9, filed Jul. 14, 2009. The foregoing applications are hereby incorporated by reference in their entireties.

BACKGROUND OF THE INVENTION

Field of the Invention

The invention generally relates to the technical field of vehicle steering systems and in particular to the field of steering shafts. More specifically, the invention relates to a steering shaft component, a steering shaft and a production method therefor. In the present document, all components that serve for steering power transmission between a steering wheel and a steering gear are understood to be a "steering shaft". For example, the term "steering shaft" includes, among other things, those components that are often referred to as "steering column" or "steering spindle".

Description of Related Art

Hydraulic or electric power-assisted steering systems ("servo steering systems") are generally used in vehicle construction today. In such steering systems, the steering forces and/or steering movements of the vehicle operator are sensed and converted into actuating motions of a hydraulic valve or into electrical signals.

DE 10 2007 047 827 A1 shows a torque sensor unit with a torsion member configured as a torsion bar. Such designs are well-known in many different forms. Generally, however, steering assemblies with torsion bars require a lot of effort with regard to production and assembly. The torsion bar is a separate component that must be drilled into the steering spindle. In practice, this results in a relatively high percentage of rejects, with an entire assembly having to be rejected in each case if it does not have the desired characteristic curve.

DE 101 20 580 A1 shows a sensor for measuring a torque of a rotating shaft, e.g. a drive or cardan shaft of a motor vehicle. This sensor measures the torsion of the shaft and converts it into an electrical signal. Though the published patent application mentions a possible use of the sensor on a steering shaft of a motor vehicle, this, however, hardly appears feasible because a steering shaft of usual dimensions twists only slightly at the usual steering forces. Thus, a sufficiently exact measurement should be difficult or at least require a lot of effort.

SUMMARY OF THE INVENTION

It is an object of the invention to propose a particularly cost-effective design of a steering shaft component. In particular, in some embodiments the steering shaft component according to the invention is supposed to be suitable for use in connection with the measurement of steering forces or the controlling of a servo steering system.

The invention is defined by the independent claims. The dependent claims relate to optional features of embodiments of the invention.

According to a first aspect of the invention, the steering shaft component comprises a first and a second steering shaft section as well as at least one first bending section extending between the first and the second steering shaft sections, wherein the first bending section is formed integrally with at least one of the steering shaft sections but has a different cross section from this steering shaft section. This embodiment is particularly cost-effective with regard to production and assembly because it reduces the number of required parts.

According to a second aspect of the invention, the steering shaft component comprises a first and a second steering shaft section with a common longitudinal axis and at least two bending sections separate from one another, wherein each of the bending sections substantially extends in the axial direction between the first and the second steering shaft sections and is disposed spaced from the common longitudinal axis.

According to a third aspect of the invention, the steering shaft component comprises a first and a second steering shaft section as well as at least one first bending section, wherein the first bending section extends between the first and the second steering shaft sections substantially in the longitudinal direction of the steering shaft component, and is subjected more to bending than to torsion upon rotation of the first steering shaft section relative to the second steering shaft section.

According to a fourth aspect of the invention, the steering shaft component comprises a tubular first steering shaft section and a tubular second steering shaft section, wherein the first and the second steering shaft sections are formed integrally with one another and have at least one cut-out that defines at least one bending section of the steering shaft component. Steering shaft components according to this aspect of the invention can be manufactured particularly cost-effectively. Moreover, such steering shaft components, due to their integral design, require fewer bearings when mounted into a motor vehicle than conventional steering shafts with torsion measuring areas.

According to the invention, a mechanical stop for limiting the maximum angle of rotation of the two steering shaft sections relative to each other is provided.

In some embodiments, the features just mentioned are combined with one another in different ways, as is specified in the dependent claims.

In some embodiments, each bending section is integrally formed with at least one of the steering shaft sections, respectively, or with the two steering shaft sections. The number of required components is thus reduced.

In some embodiments, two, three, four, five or more bending sections can be provided. These bending sections can be defined by a corresponding number of cut-outs, which can be configured U-shaped or H-shaped themselves.

In some embodiments, the stop for limiting the maximum angle of rotation of the two steering shaft sections relative to each other is formed by at least one stop area of one of the steering shaft sections being configured to come into contact with at least one bending section or at least a part of the other steering shaft section when the maximally admissible angle of rotation is reached. In different embodiments, the stop area can be laterally substantially rigid or yielding, with a laterally yielding stop area serving for cushioning a lateral stopping impact.

In some embodiments, a pull-out protection means is provided which prevents the steering shaft sections from being pulled apart in the axial direction.

In some embodiments, the steering shaft component comprises an influencing device that reacts to a rotation of the first steering shaft section relative to the second steering shaft section. The influencing device can be a sensor or a valve, for example.

In some embodiments, at least one further component is provided which comprises at least one web that reaches into one of the cut-outs between the bending sections and adjacent stop areas. This further component can be configured as a ring or as a clip, for example.

The steering shaft according to the invention comprises a steering shaft component and optionally further components.

In a method according to the invention, a steering shaft component is produced by at least one cut-out being stamped into a flat metal workpiece, the stamped workpiece being rounded to form a tube, and the tube being welded together.

BRIEF DESCRIPTION OF THE DRAWINGS

Other features, advantages and object of the invention become apparent from the attached schematic drawings of several sample embodiments. In the figures:

FIG. 1A and FIG. 1B respectively show a perspective view of a tubular section of a steering shaft component according to a first exemplary embodiment of the invention, FIG. 1C shows a side view of the steering shaft component in the first exemplary embodiment, FIG. 1D shows an enlarged cross-sectional view along the line D-D in FIG. 1C, FIG. 3A shows an exploded view of a steering shaft component according to a third exemplary embodiment of the invention, FIG. 3B shows an enlarged cross-sectional view along the line B-B in FIG. 3A, FIG. 4 shows a perspective view of a tubular section of a steering shaft component according to a fourth exemplary embodiment of the invention, FIG. 5 shows a perspective view of a tubular section of a steering shaft component according to a fifth exemplary embodiment of the invention, FIG. 6A and FIG. 6B respectively show a perspective view of a tubular section of a steering shaft component according to a sixth exemplary embodiment of the invention, FIG. 12A shows a perspective view of a tubular section of a steering shaft component according to a twelfth exemplary embodiment of the invention, FIG. 12B shows an enlarged side view of the section of the steering shaft component of FIG. 12A, FIG. 12C shows an enlarged perspective view of a ring in the steering shaft component of FIGS. 12A and 12B, FIG. 13A shows a perspective view of a tubular section of a steering shaft component according to a thirteenth exemplary embodiment of the invention, FIG. 13B shows an enlarged view of a clip in the section of the steering shaft component of FIG. 13A, FIG. 14A shows a perspective view of a tubular section of a steering shaft component according to a fourteenth exemplary embodiment of the invention, FIG. 14B shows an enlarged view of a clip in the section of the steering shaft component of FIG. 14A, and FIG. 15 shows a perspective view of a tubular section of a steering shaft component according to a fifteenth exemplary embodiment of the invention, into which a clip similar to FIG. 14B is inserted.

DETAILED DESCRIPTION OF EXEMPLARY EMBODIMENTS

Figure 2A:
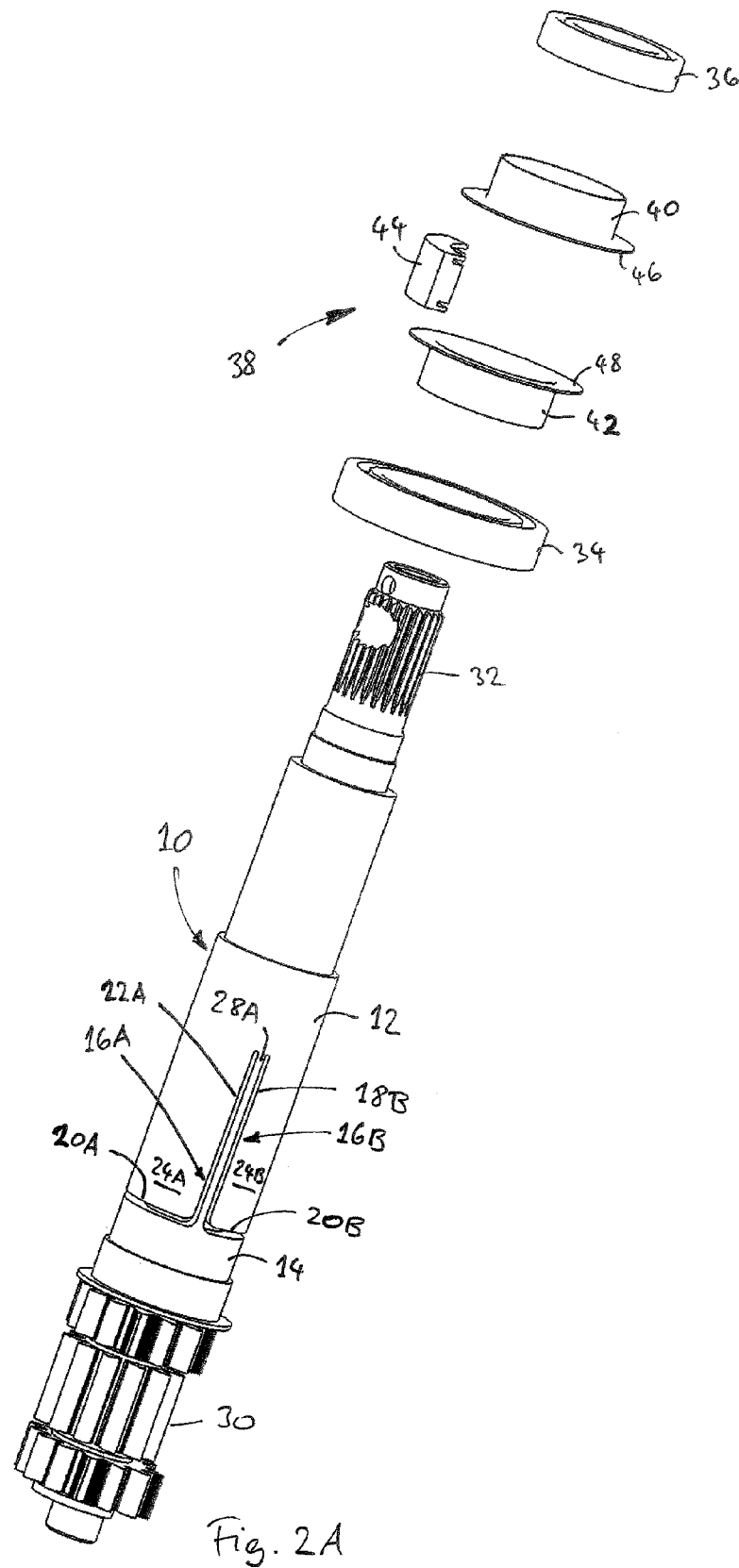
FIG. 2A shows an exploded view of a steering shaft component according to a second exemplary embodiment of the invention.

The exemplary embodiment shown in FIGS. 1A-1D is characterized by particularly low production costs. A steering shaft component 10 is configured as an integral tube with a first steering shaft section 12 and a second steering shaft section 14. The two steering shaft sections 12, 14 are disposed axially one behind the other and have a common longitudinal axis A.

It goes without saying that the steering shaft component 10 can continue beyond the area depicted in the drawings and may comprise further—integrally formed or attached—elements. In particular, the steering shaft component 10 may in some embodiments be a steering column for mounting into a motor vehicle, whereas in other embodiments, the steering shaft component 10 forms just a relatively short section of a steering shaft—e.g. a steering spindle with a pinion disposed on a steering gear.

Between the two steering shaft sections 12, 14, the steering shaft component 10 in the present exemplary embodiment comprises three H-shaped cut-outs 16A, 16B, 16C, which are collectively referred to below by 16x. As is shown in FIG. 1A by way of example, the cut-out 16A consists of a first axially (in the direction of the longitudinal axis A) extending cut 18A, into which an end of a cut 20A extending in the circumferential direction leads approximately centrally. On its other end, the cut 20A leads into a second axially extending cut 22A, again approximately centrally. The cut-out 16A formed from the three cuts 18A, 20A and 22A defines a rigid stop area 24A of the first steering shaft section 12 and a rigid stop area 26A of the second steering shaft section 14.

Accordingly, the cut-outs 16B and 16C are formed with one first axial cut 18B, 18C, respectively, one cut 20B, 20C extending in the circumferential direction, respectively, and with one axial cut 22B, 22C, respectively. First rigid stop areas 24B, 24C of the first steering shaft section 12 and second rigid stop areas 26B, 26C of the second steering shaft section 14 are limited by these cut-outs 16B, 16C.

Two adjacent cut-out 16x at a time define a bending section 28A, 28B, 28C—collectively referred to below by 28x. More specifically, the first bending section 28A is laterally limited by the second axial cut 22A of the first cut-out 16A and the first axial cut 18B of the second cut-out 16B. Accordingly, the second axial cut 22B of the second cut-out 16B and the first axial cut 18C of the third cut-out 16C define the second bending section 28B. Finally, the third bending section 28C is defined by the second axial cut 22C of the third cut-out 16C and the first axial cut 18A of the first cut-out 16A.

Each bending section 28x extends between the first steering shaft section 12 and the second steering shaft section 14 approximately parallel to the common longitudinal axis A, but laterally (in the radial direction) offset thereto. The two steering shaft sections 12, 14 are interconnected through the bending sections 28x, but otherwise separated from each other by the cuts 20x.

Towards the outside and the inside, the bending sections 28x end flush with the outer and inner wall, respectively, of the tubular steering shaft sections 12, 14, so that the depth of the bending sections 28x matches the wall thickness of the steering shaft sections 12, 14. This depth may amount to, for example, at least 2 mm or at least 3 mm or at least 5 mm. The side surfaces of the bending sections 28x facing in the circumferential direction extend slightly obliquely along radial rays originating at the longitudinal axis A. Thus, each of the bending sections 28x has the shape of a sector of an arc of a circle.

In exemplary embodiments, the bending sections 28x may have a length (in the direction of the longitudinal axis A) of at least 2 cm or at least 3 cm or approximately 4-5 cm. In the circumferential direction, the bending sections 28x are relatively narrow; at their outwardly facing side, for instance, they may have a width of at most 8 mm or at most 3 mm or approximately 0.5-3 mm. Given typical steering shaft diameters, this corresponds to an angle range of at most 30° or at most 15° or approximately 2°-15° for each bending section 28x. The cuts 20x extend over the remaining circumference of the steering shaft component 10, i.e. for example over an angle range of more than 270° or more than 310° or approximately 310°-355°.

In many embodiments of the present invention, the bending sections 28x are configured significantly longer than wide; for example, the length of the bending sections 28x may be at least 5 times or at least 10 times or at least 15 times the maximum width (at the outer circumference).

The cuts 18x, 20x, 22x of the cut-outs 16x are relatively narrow; their width may be, for example, less than 3 mm or less than 2 mm or approximately 1-2 mm. In the present exemplary embodiment, this width is approximately constant over the entire depth of the cuts 18x, 20x, 22x.

In the present exemplary embodiment, the bending sections 28x are formed integrally with both the first steering shaft section 12 as well as the second steering shaft section 14. Therefore, in order to fabricate the entire structure shown in FIGS. 1A-1D, the cut-outs 16x only have to be cut into a suitably dimensioned tube or punched into a flat metal workpiece that is later rounded to form a tube.

During the operation of the steering shaft component 10, the steering shaft sections 12, 14 rotate relative to each other when the vehicle operator executes steering movements. The two steering shaft sections 12, 14 remain aligned with the longitudinal axis A at any angle of rotation. When the steering shaft sections 12, 14 are rotated, the bending sections 28x are not, or only to a slight extent, subjected to torsion but substantially are bent towards the side (in the circumferential direction of the steering shaft component 10).

In the case of low steering forces, the angle of rotation between the steering shaft sections 12, 14 is proportional to the torque exerted on the steering shaft component 10. This angle of rotation is measured and/or converted into a steering action by a suitable influencing device (not shown in FIGS. 1A-1D). For example, the influencing device may be an electric or optical or magnetic sensor that outputs steering force signals to an electronic control system. In other embodiments, the influencing device may be a hydraulic valve for controlling a hydraulic power-assistance unit.

A mechanical stop limits the maximum rotation of the two steering shaft sections 12, 14 relative to each other in both directions—starting from the non-loaded position according to FIGS. 1A-1D—to a few degrees, respectively. In the present exemplary embodiment, this mechanical stop is formed by one side surface, respectively, of each of the six rigid stop areas 24x, 26x abutting against one side surface, respectively, of a bending section 28x. For example, in the case of a clockwise rotation of the first steering shaft section 12 in FIG. 1A, a side surface of the rigid stop area 24A abuts against the third bending section 28C, a side surface of the rigid stop area 26A abuts against the third bending section 28A, and so on. The same applies, mutatis mutandis, in the case of a counter-clockwise rotation of the first steering shaft section 12 in FIG. 1A.

The maximum angle of rotation of the two steering shaft sections 12, 14 is defined by the width of the axial cuts 18x, 22x. Given the width of a few millimeters mentioned above by way of example, the maximum angle of rotation, for example, is less than 10° or less than 5° or less than 3°. Because the bending sections 28x, in relation to their length, are dimensioned relatively narrow, this angle is reached already at medium-sized steering forces and the mechanical stop thus becomes effective.

Certain shearing forces act on the bending sections 28x in the stop position. Of course, it must be ensured that the bending sections 28x are not damaged thereby. In particular, the design of the axial cuts 18x, 22x with a constant width serve for the protection of the bending sections 28x, whereas the bending sections 18x and the stop areas 24x, 26x, with regard to their cross section, are configured as sectors of an arc of a circle. When the steering shaft sections 12, 14 are rotated up to the stop, the bending sections 18x therefore rest against the respective stop areas 24x, 26x over their entire depth.

It goes without saying that more or less than three cut-outs 16x can be provided in alternative embodiments, in particular only two cut-outs or four, five, six, seven or eight cut-outs. In that case, the steering shaft component 10 comprises a corresponding number of bending sections 28x. In some embodiments, only a single cut-out and/or a single bending section can be present on one side of the steering shaft component 10. As a rule, an additional external guide sleeve or an internal guide pin is then required in order to ensure that the steering shaft sections 12, 14 remain on their common longitudinal axis A when steering forces are exerted on the steering shaft component 10. Of course, these possible alternatives are provided not only in the exemplary embodiment according to FIGS. 1A-1D, but in all exemplary embodiments described in the present document.

Figure 2B:
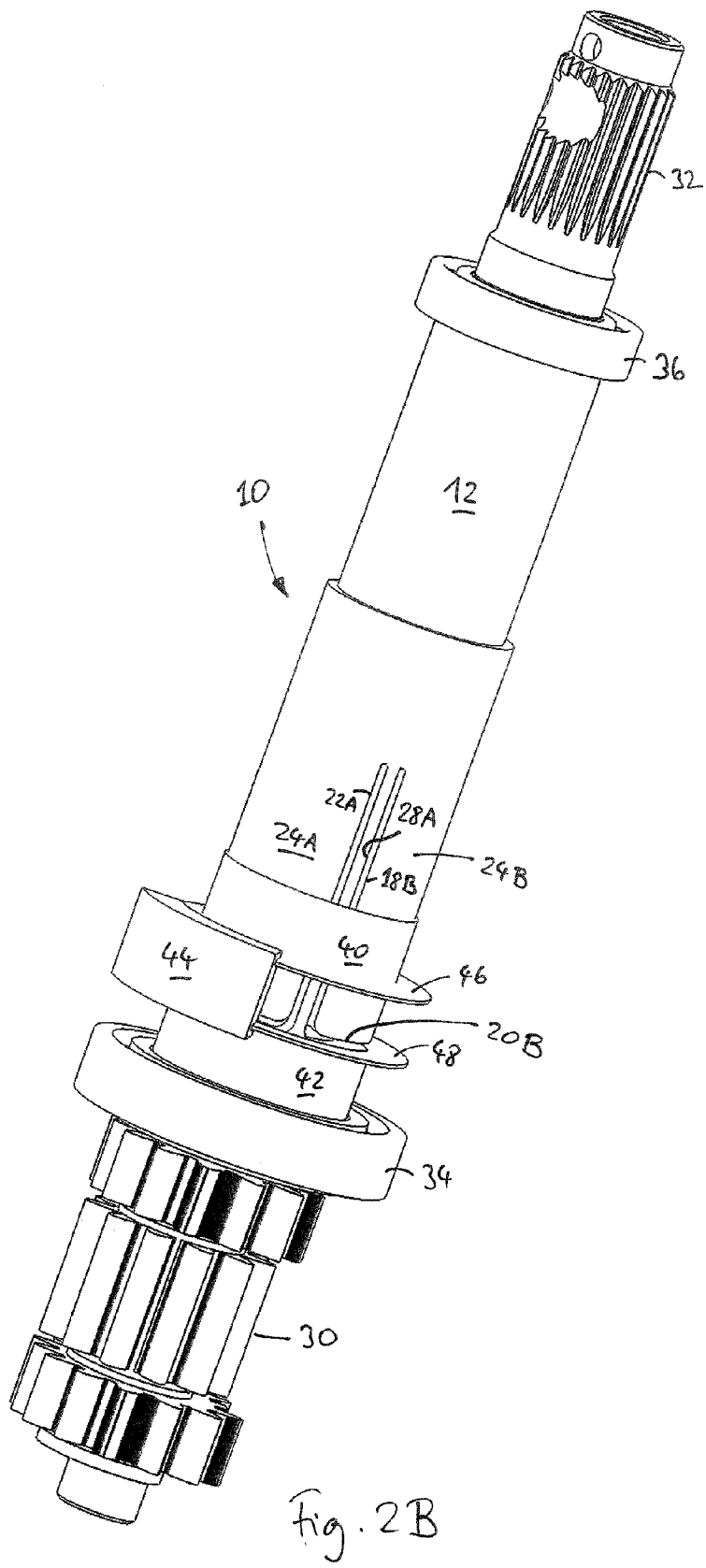
FIG. 2B shows a perspective view of the steering shaft component of FIG. 2A.

In the exemplary embodiment shown in FIGS. 2A and 2B, the steering shaft component 10 is configured as a steering spindle and comprises a pinion 30, the two steering shaft sections 12, 14 as well as a toothed connector 32 for a steering column or a cross joint. The steering shaft component 10 according to FIGS. 2A and 2b, with regard to its design, may exactly correspond to a conventional steering spindle with a torsion bar so that no changes to an already existing housing are required.

In the steering shaft component 10 according to FIGS. 2A and 2B, each of the cut-outs 16x is configured to be U-shaped. In other words, the circumferentially extending cut 20x of each cut-out 16x is not formed approximately in the center, but at the, in FIGS. 2A and 2B, lower end of the associated axial cuts 18x, 22x. At the transitions between the cut 20x that extends in the circumferential direction and the axial cuts 18x, 22x, rounded portions are formed which reduce the mechanical stress on the bending sections 28x due to shearing forces acting on the bending sections 28x in a stop position of the steering shaft component 10. It goes without saying that all exemplary embodiments described in the present document may optionally be configured with H-shaped or with U-shaped cut-outs 16x.

FIGS. 2A and 2B moreover show two bearings 34, 36 for supporting the steering shaft component 10 in a steering spindle housing (not shown) of a rack-and-pinion steering system. Moreover, FIGS. 2A and 2B show an influencing device 38 which has two magnetic rings 40, 42 and a sensor 44 in the present exemplary embodiment. The magnetic rings 40, 42 are pressed onto one of the steering shaft sections 12, 14, respectively, so that the first magnetic ring 40 is non-rotatably connected to the first steering shaft section 12 and the second magnetic ring 42 is non-rotatably connected to the second steering shaft section 14.

Radial flanges 46, 48 of the magnetic rings 40, 42 comprise a plurality of magnetized areas. The sensor 44 is configured as an electrical magnetic field sensor that senses the flanges 46, 48 of the magnetic rings 40, 42 and determines a rotation of the magnetic rings 40, 42 relative to each other—corresponding to a rotation of the steering shaft section 12, 14. The sensor 44 generates an electrical signal that indicates the determined rotation and thus the exerted steering force. The sensor 44 shown in FIGS. 2A and 2B is merely to be considered an example; other suitable sensor designs are well-known as such and can also be used in connection with the steering shaft component 10 according to the invention.

Moreover, the magnetic ring 40 has the effect that it stabilizes the steering shaft section 12 and safely prevents any risk that the stop areas 24x could be pushed outwards in the event of exceptional load. It goes without saying that this effect can also be obtained with a different ring that is not configured as a magnetic ring. Such retaining rings may be provided in all of the exemplary embodiments of the invention described herein, on the steering shaft section 12 at the level of the stop areas 24x and/or the steering shaft section 14 at the level of the stop areas 26x.

In the exemplary embodiment shown in FIGS. 3A and 3B, the steering shaft component 10 is configured as a steering spindle for a hydraulic servo steering system. An outer sleeve 50 with inlets and outlets 52 for hydraulic fluid is non-rotatably connected to the second steering shaft section 14. Fluid channels 54 are incorporated into the first steering shaft section 12—more specifically, into the outer surface of the stop areas 24x. The outer sleeve 50, in conjunction with the fluid channels 54, forms a rotary slide valve. In a manner known per se, a rotation of the two steering shaft sections 12, 14 relative to each other controls the throughput of hydraulic fluid, which serves for steering power-assistance, through the rotary slide valve. The specific design of the hydraulic valve shown in FIGS. 3A and 3B is to be considered only an example. Many other embodiments of hydraulic valves are known as such and can be used with the steering shaft component 10 according to the invention.

It is apparent from FIG. 3B that the steering shaft component 10 of the present exemplary embodiment comprises four bending sections 28A, 28B, 28C, 28D and, correspondingly, four—in this case rigid—stop areas 24A, 24B, 24C, 24D enclosed by the cut-outs 16x. As was already mentioned, all of the exemplary embodiments described in the present document can be configured with different numbers—preferably three or four—of cut-outs 16x, bending sections 28x, stop areas 24x and, optionally, stop areas 26x.

FIGS. 4 and 5 show two alternative embodiments of the mechanical stop for limiting the maximum angle of rotation between the steering shaft sections 12, 14. In these embodiments, the function of the bending sections 28x is separate from the function of the mechanical stop in order to reduce the mechanical stress on the bending sections 28x. It goes without saying that the embodiments of the mechanical stop according to FIGS. 4 and 5 can be combined with all other exemplary embodiments described herein.

In the exemplary embodiment according to FIG. 4, the second steering shaft section 14 comprises a plurality of tabs 56A, 56B—collectively 56x—which in a rest position of the steering shaft component 10 protrude, with a spacing on both sides, into one recess 58A, 58B, respectively,—collectively 58x—of the first steering shaft section 12. Each recess 58x is formed by an area of one of the cut-outs 16x. When the first steering shaft section 12 in FIG. 4 is rotated clockwise relative to the second steering shaft section 14, the right side walls of the recesses 58x respectively abut against the right side walls of the tabs 56x and limit the maximum angle of rotation. In the case of a counter-clockwise rotation, the left side walls of the recesses 58x abut against the left side walls of the tabs 56x. Here, the axial cuts 18x, 22x of the cut-outs 16x are dimensioned wider, so that the bending sections 28x do not come into contact with the stop areas 24x in any of the possible rotation positions.

In the exemplary embodiment shown in FIG. 5, substantially rigid tabs 56x, which transition into the narrower and elastic bending sections 28x towards the first steering shaft component 12, are formed on the second steering shaft component 14. In the case of a clockwise rotation of the first steering shaft section 12, the tab 56A, with its right side wall, abuts against the adjacent left side wall of the stop area 24B. Correspondingly, the tab 56A, with its left side wall, abuts against the right side wall of the stop area 24A in the case of a counter-clockwise rotation of the first steering shaft section 12. Again, the bending sections 28x are preserved because they do not assume any of the functions of a stop.

Another exemplary embodiment, in which a cushioning for the lateral rotation stop is provided, is shown in FIGS. 6A and 6B. The exemplary embodiment is based on the design according to FIG. 5, but it goes without saying that all other embodiments described in the present document may also be developed further to have a cushioning function according to the principle described below.

In FIGS. 6A and 6B, the stop areas 24x are configured not to be rigid, but laterally yielding. For this purpose, openings 68x, 70x are incorporated into the stop areas 24x, i.e. for example openings 68B, 70B in the stop area 24B. In the present example, the openings 68x, 70x are shown as axially extending slots that originate at the cut-out 16x and which divide each stop area 24x into three tongues 74x, 76x, 78x. However, embodiments are also provided in which the openings 68x, 70x have a different shape. Moreover, the openings 68x, 70x can be configured in such a way that they assume additional functions—for example, the function of a pull-out protection means described below.

When—in the event of a clockwise rotation of the first steering shaft section 12—the tab 56, with its right side wall, abuts against the left side wall of the stop area 24B, then the relatively narrow tongue 74B between the cut 18B and the opening 68B at first yields until the opening 68B is compressed completely on the side thereof which is open at the bottom. It is not until then, i.e. when the lateral tongue 74B abuts against the central tongue 76B of the stop area 24B, that a substantially rigid stop occurs. Thus, this results in a steering force characteristic which is at first determined only by the spring constant of the bending sections 28x and runs in a relatively shallow manner, which then has a steeper section in which the tongue 74 is bent laterally, and which finally rises steeply as soon as the lateral tongue 74B abuts against the central tongue 76B. The material stress is reduced and the steering feel improved by a stop that is cushioned in such a graduated manner.

Figure 7:
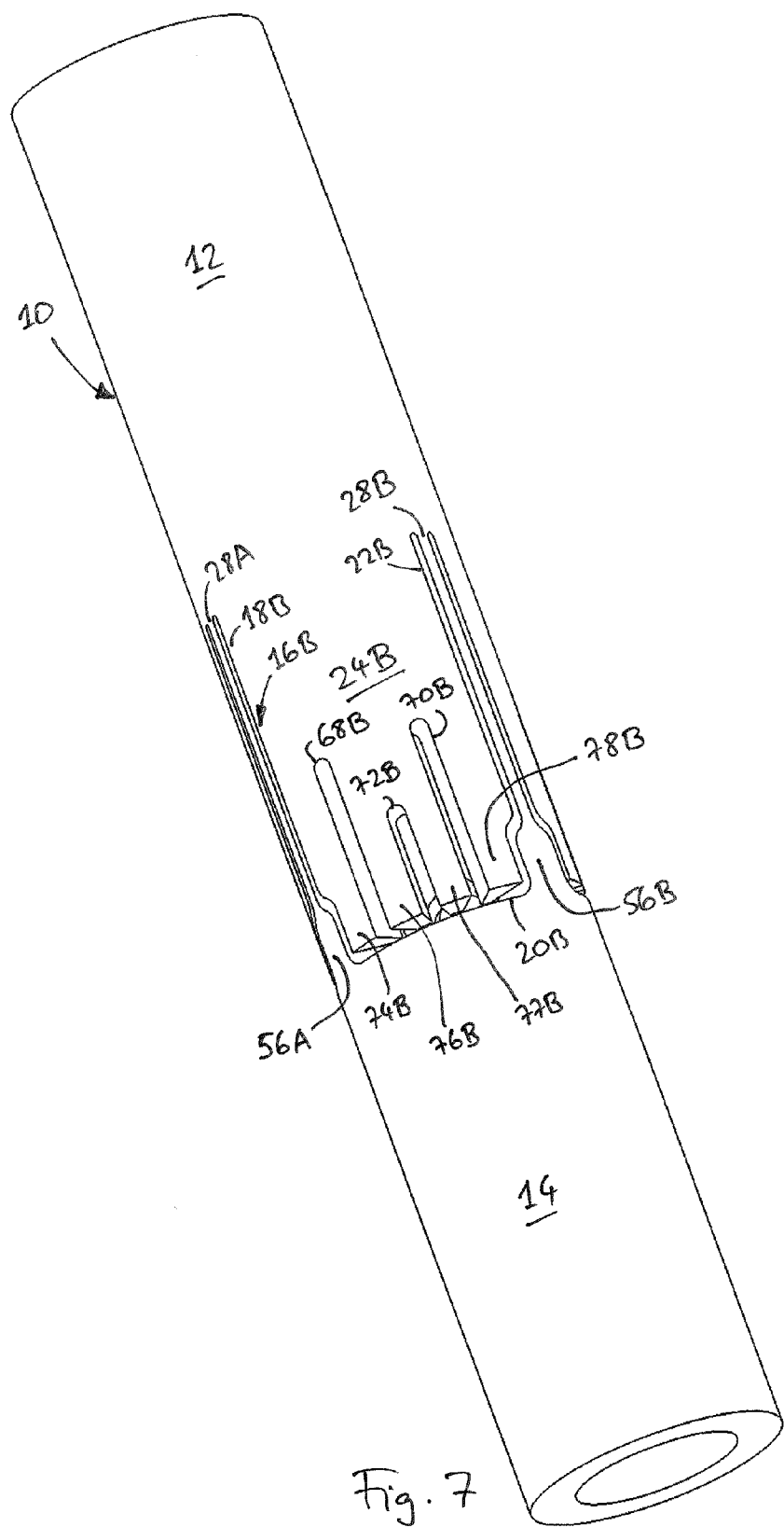
FIG. 7 shows a perspective view of a tubular section of a steering shaft component according to a seventh exemplary embodiment of the invention.

The basic principle just described of a laterally yielding stop can be continued in other embodiments in order to obtain a finer graduation of the steering force characteristic. FIG. 7, for example, shows an embodiment in which the stop area 24B is divided by three slot-shaped openings 68B, 72B, 70B into four tongues 74B, 76B, 77B, 78B. The outer openings 68B, 70B are designed to be longer in the axial direction than the central opening 72B, so that, correspondingly, the two outer tongues 74B, 78B are more yielding laterally than the central tongues 76B, 77B. The other two stop areas 24A, 24C are configured accordingly.

The design according to FIG. 7 results in a delicate steering characteristic which slopes ever more steeply as the compression of the openings 68B, 70B, 72B, and thus the number of the acting tongues 74B, 76B, 77B, 78B, increases. It goes without saying that such a cushioning design can also be used in all other embodiments described in the present document.

In the hitherto described exemplary embodiments, the two steering shaft sections 12, 14 are interconnected only by the relatively thin bending sections 28x. Depending on the type of bearing of the steering shaft, a considerable tensile force may be exerted on the steering shaft component 10 in some driving situations. In extreme cases, there is the possibility of the relatively thin steering shaft section 12, 14 being pulled off.

Figure 8:
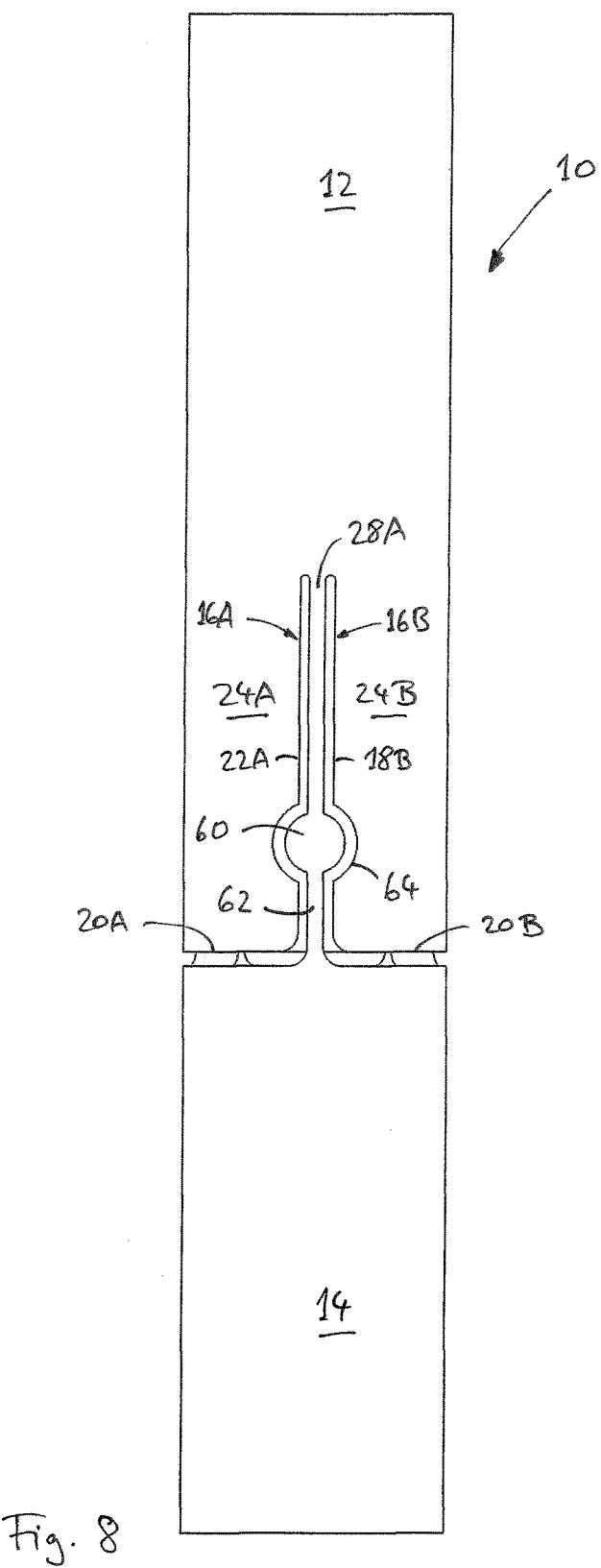
FIG. 8 shows a side view of a tubular section of a steering shaft component according to an eighth exemplary embodiment of the invention.

In order to rule out this possibility, a pull-out protection means is provided in the exemplary embodiment shown in FIG. 8. The pull-out protection means comprises a widened portion 60 which is connected to the second steering shaft section 14 through a web 62. In the region of the widened portion 60, the cut-outs 16A, 16B form a region 64 encompassing the widened portion 60, whereas in the region of the web 62, the cut-outs 16A, 16B leave free space that amounts to less than the width of the widened portion 60. If an excessive tensile force is exerted on the steering shaft component 10, the side of the widened portion 60 shown at the bottom of FIG. 8 abuts against the bottom end of the encompassing region 64 so that the bending sections 28 are prevented from being extended further and the steering shaft sections 12, 14 from being pulled apart.

In alternative embodiments, the web 62 may be configured to be wider than the bending sections 28A—but narrower than the widened portion 60—so that the web 62 serves as a rotation angle limitation at the same time—similar to what is shown in FIG. 5. Moreover, the tabs 56x may also be provided with a widened portion at their ends in the exemplary embodiment according to FIG. 4. Together with suitably configured recesses 58x, the tabs 56x may then act both as a pull-out protection means as well as limit the maximum angle of rotation. It goes without saying that all the embodiments described in this document may be further developed with a pull-out protection means as shown in FIG. 8 or as described in the present paragraph.

In all of the hitherto described exemplary embodiments, the two steering shaft sections 12, 14 are formed integrally or at least inseparably interconnected. However, embodiments in which the two steering shaft sections 12, 14 are two separate components at least during fabrication are also provided. Though such embodiments comprise more components, they are advantageous in that some machining methods can be carried out more easily given separate steering shaft sections 12, 14. Moreover, different variants of the steering shaft sections 12, 14 may then be joined to form steering shaft components 10 in a plurality of possible combinations, as in a modular system.

Figure 9A:
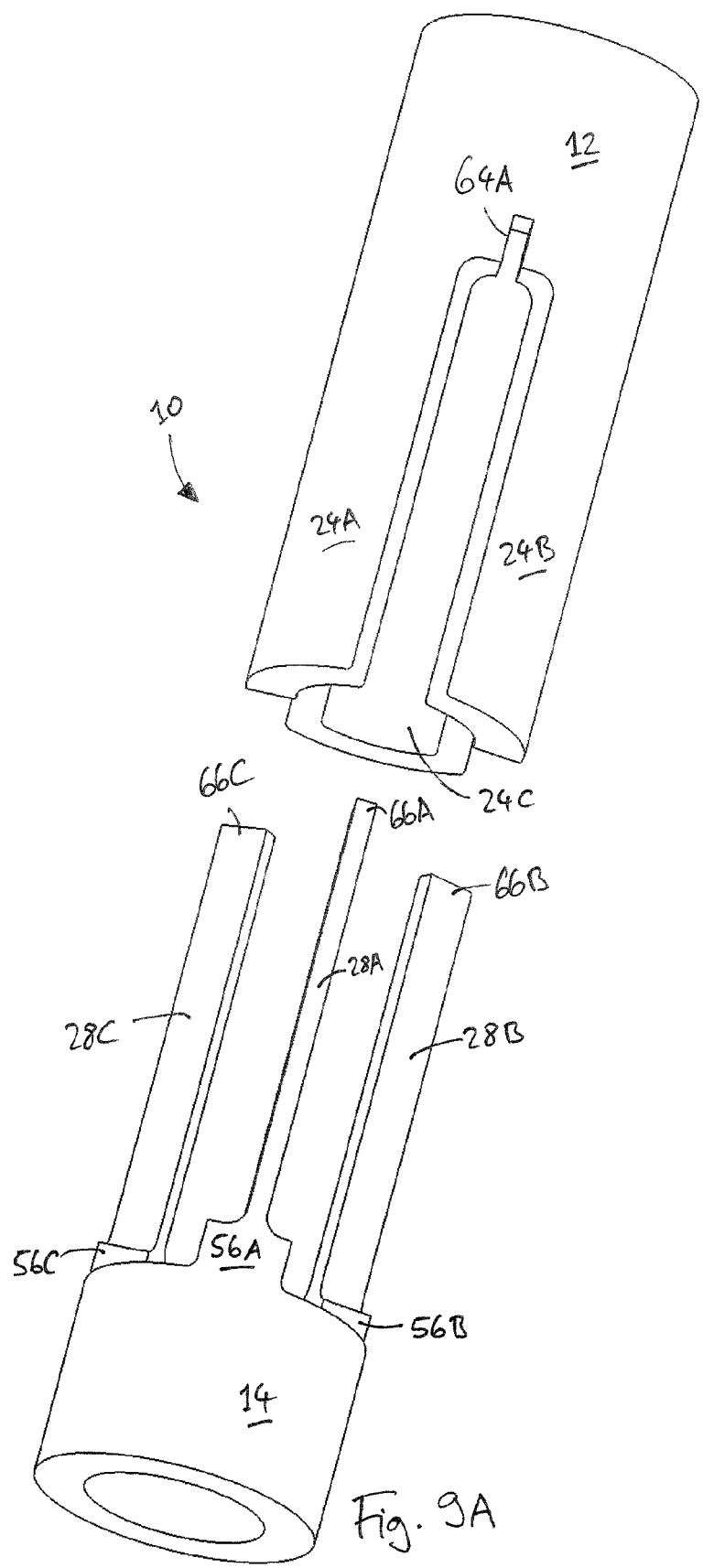
FIG. 9A shows an exploded view of a tubular section of a steering shaft component according to a ninth exemplary embodiment of the invention.
Figure 9B:
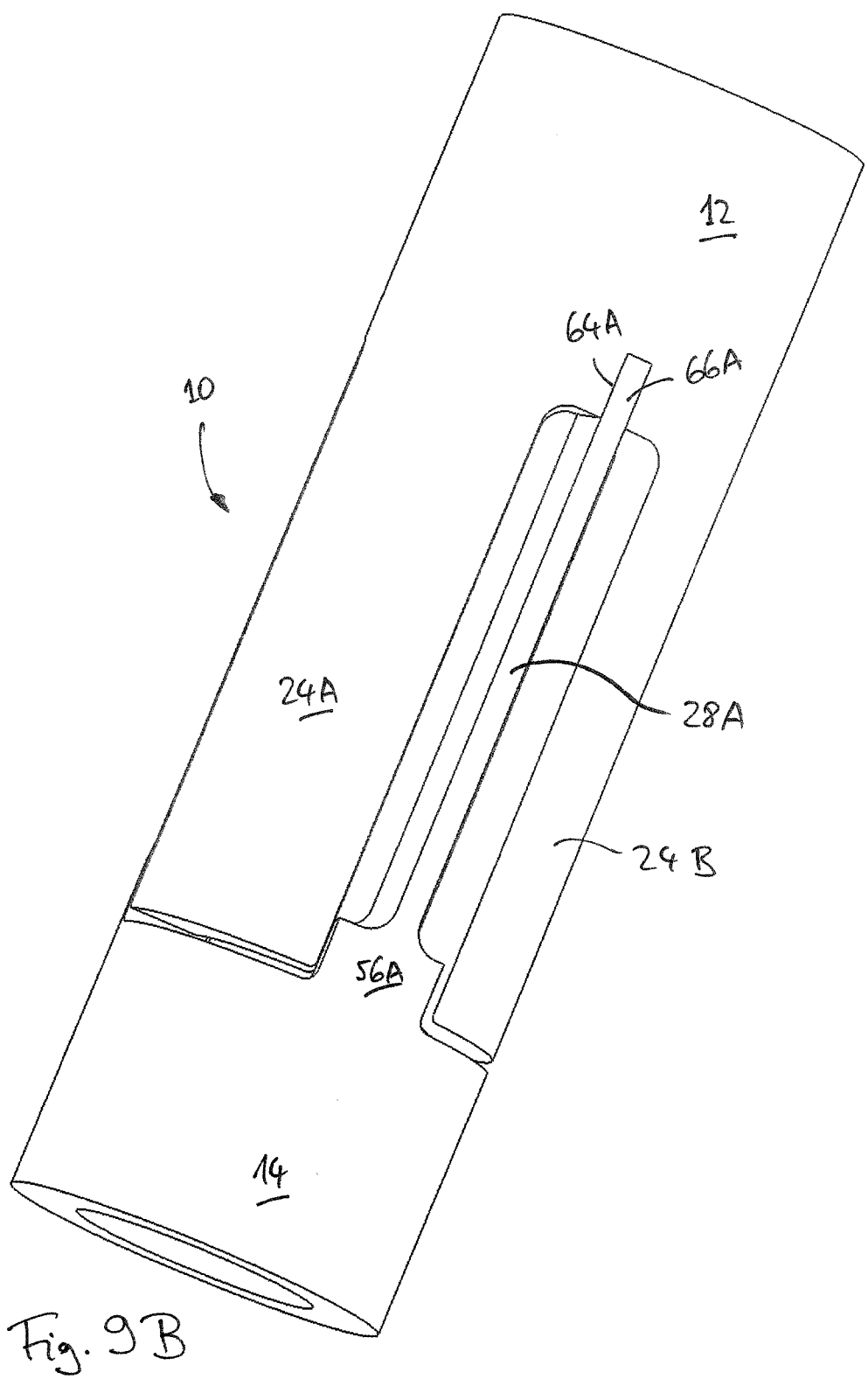
FIG. 9B shows a perspective view of the section of the steering shaft component of FIG. 9A.

In the exemplary embodiment shown in FIGS. 9A and 9B, the bending sections 28x are formed integrally with the second steering shaft section 14. Moreover, the second steering shaft section 14 comprises tabs 56x for limiting rotation, as was already described in connection with FIG. 5. The first steering shaft section 12 is configured with three rigid stop areas 24x between which cut-outs with grooves 64x—only one groove 64A is shown in FIGS. 9A and 9B—are located.

During assembly, the two steering shaft sections 12, 14 are pushed into each other and in the process, each end 66A, 66B, 66C—collectively 66x—of a bending section 28x is pressed into the associated groove 64x. The ends 66x can be retained in the grooves 64x by press fit or be welded or soldered or glued. In the finished steering shaft component 10, the two steering shaft sections 12, 14 can be firmly interconnected or detachable from each other. The function of the steering shaft component 10 according to FIGS. 9A and 9B, which is fabricated from two parts, is identical to the function of the exemplary embodiment according to FIG. 5.

Figures 10A, 10B:
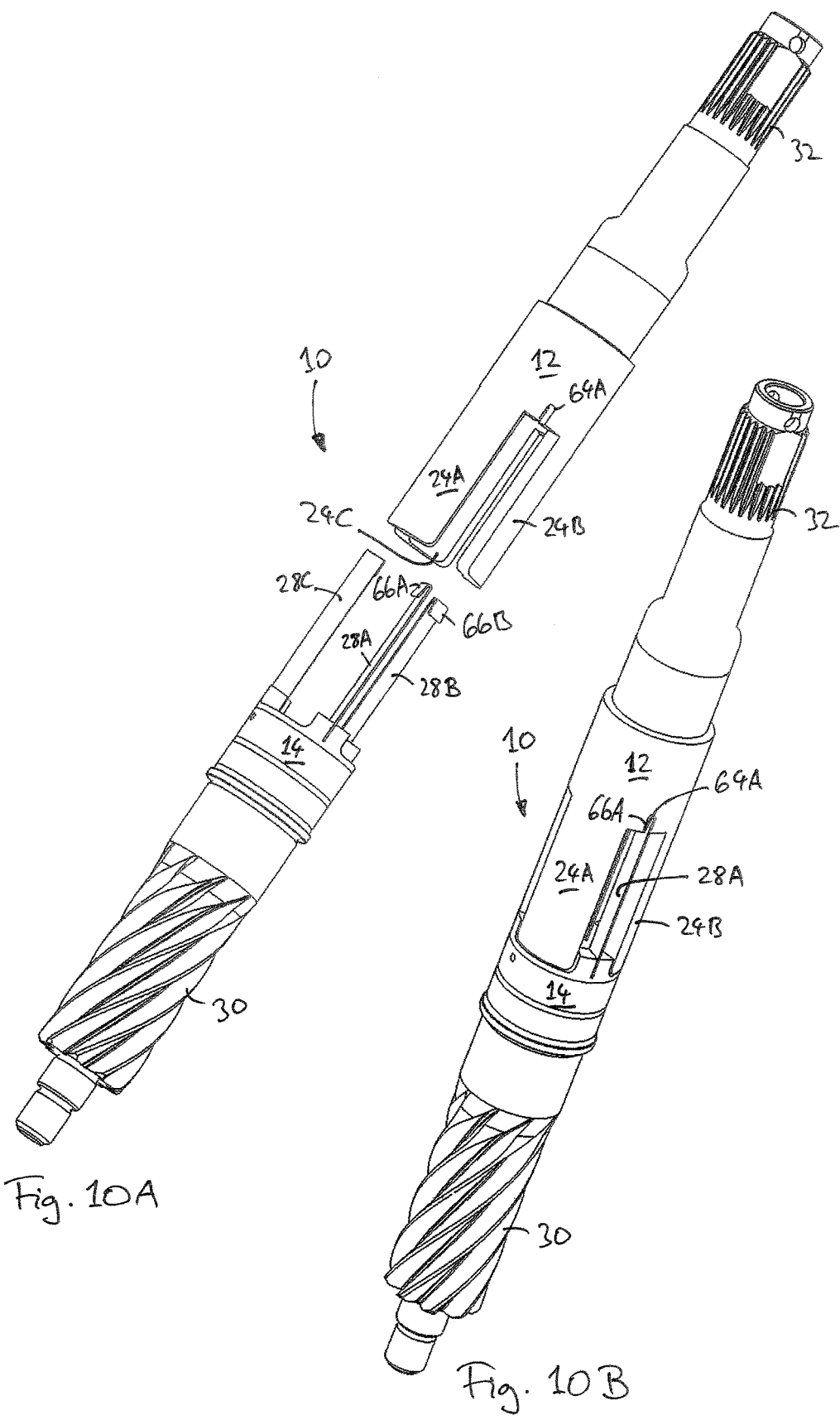
FIG. 10A shows an exploded view of a steering shaft component according to a tenth exemplary embodiment of the invention.
FIG. 10B shows a perspective view of the steering shaft component of FIG. 10A.
Figure 11A:
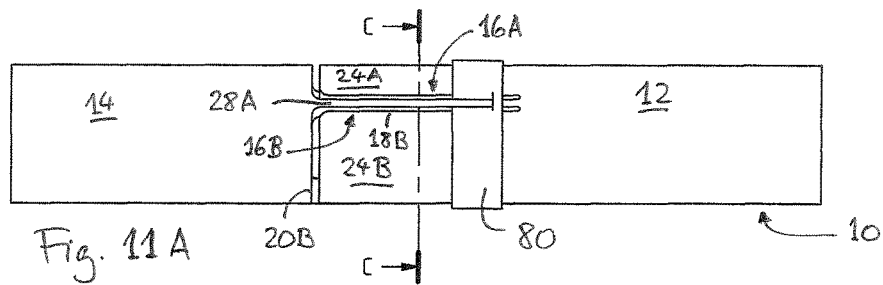
FIG. 11A shows a side view of a tubular section of a steering shaft component according to an eleventh exemplary embodiment of the invention.
Figure 11B:
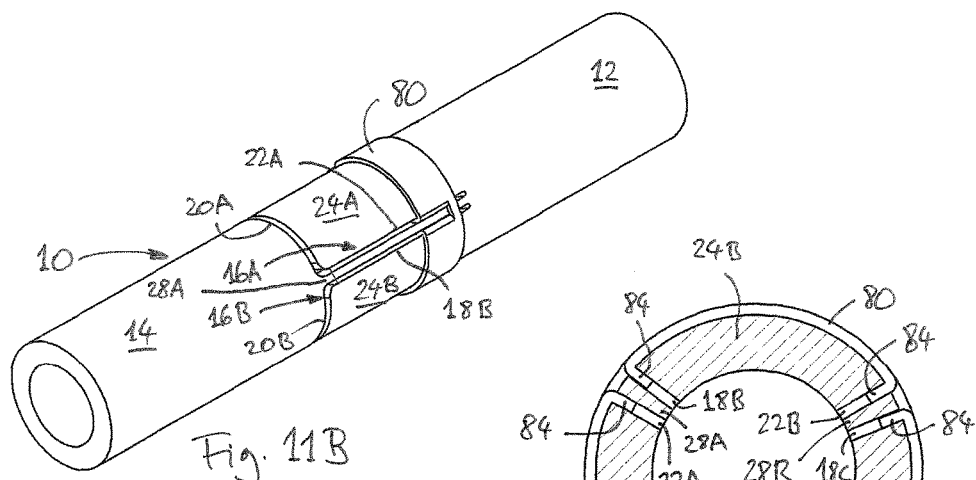
FIG. 11B shows a perspective view of the section of the steering shaft component of FIG. 11A.
Figure 11C:
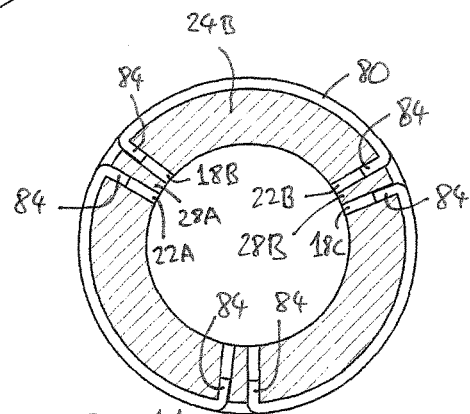
FIG. 11C shows an enlarged cross-sectional view along the line C-C in FIG. 11A.
Figure 11E:
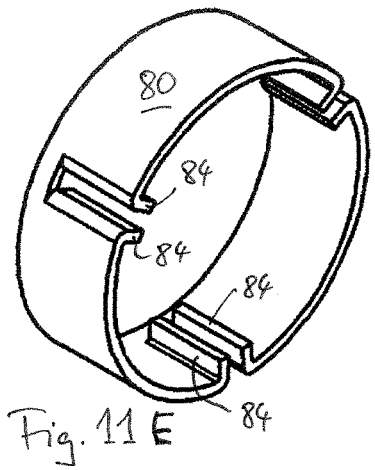
FIG. 11E shows an enlarged perspective view of the ring of FIG. 11D.
Figure 11D:
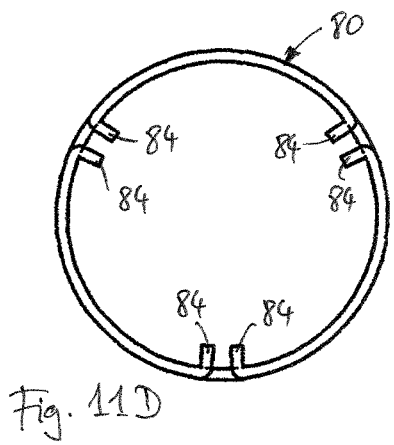
FIG. 11D shows an enlarged side view of a ring in the steering shaft component of FIGS. 11A-11C.

In another embodiment shown in FIGS. 10A and 10B, the bending sections 28x are configured as leaf springs that are integral with none of the two steering shaft sections 12, 14. On the part of the second steering shaft section 14, ends of the bending sections 28x are pressed into grooves located in the tabs 56x. The bending sections 28x can be retained therein by press fit, or be firmly connected—in particular welded or soldered or glued. At their end portions 66x facing the first steering shaft section 12, the bending sections 18x are bent and inserted into the grooves 64x. In the present exemplary embodiment, bending sections 18x are retained in the grooves 64x only by the spring tension of their end portions 66x, whereas a firm and/or inseparable connection is provided in alternative embodiments. In particular, every end portion 66x may reach behind a suitably formed offset of the associated groove 64x like a barb.

The steering shaft component 10 described herein can be produced in various methods. In the case of embodiments with integrally formed steering shaft sections 12, 14, the desired cut-outs 16x can be worked into a tubular workpiece by a suitable cutting method. Embodiments with two initially separate steering shaft sections 12, 14 may also be fabricated from two workpieces in this manner. Cutting methods include water-jet cutting, plasma cutting, laser cutting or electron beam cutting (EB-cutting; EB=electron beam). These methods result in workpieces of high quality but require relatively long cycle times.

Moreover, manufacturing processes are provided in which the cut-outs 16x are formed by a fast and cost-effective method—for example punching—into a flat metal workpiece, for example a metal sheet or a metal plate or a metal strip. The punched workpiece is then rounded to form a tube and welded together with a longitudinal welding seam. Further components—e.g. a pinion—can also be welded on to the tube in this connection. This method is suitable both for producing integrally formed steering shaft sections 12, 14 as well as for producing individual steering shaft sections 12, 14 as they are used, for example, in the embodiments according to FIGS. 9A and 9B.

FIGS. 11A-15 show embodiments in which the steering shaft component 10 comprises additional components configured as a ring 80 (FIG. 11A-FIG. 12C) or as a clip 82 (FIG. 13A-FIG. 15) that can be plugged on. It is a common feature of these components that, in the assembled state, they comprise webs 84 that face radially inwardly and which reach into the cut-outs 16x between the bending sections 28x and adjacent stop areas 24x, 26x. The webs 84 either have the same width as the cut-outs 16x in the area of the engagement of the webs 84 or a part of this width. In the former case, the webs 84 fixate the corresponding bending section 28x in the cut-outs 16x, whereas in the latter case, the webs 84 constitute a stop for the maximum lateral deflection of the bending section 28x. It goes without saying that components with webs 84 may not only be configured in the forms shown herein by way of example, as rings 80 or clips 82, but also in other designs. Such components may be used in all of the exemplary embodiments described in the present document.

In the case of the ring 80 shown in FIGS. 11A-11E, the webs 84 completely fill the clear width of the cut-outs 16x—more specifically, of the axial cuts 18x, 22x of the cut-outs 16x. In other words, the ring 80 fixes the part of the bending sections 28x located at the level of the ring 80 between the stop areas 24x. The spring action of the steering shaft component 10 is in that case caused only by that part of the bending sections 28x that is located between the ring 80 and the second steering shaft section 14. Therefore, the axial position of the ring 80 has an influence on the effective spring characteristic, and thus on the steering characteristic.

In some embodiments, the ring 80 can be adjusted during the assembly of the steering system and then firmly fixed. However, the axial position of the ring 80 can also be adjustable by a car repair shop. In other embodiments, the ring 80 is configured so as to be displaceable in a motor-operated manner, so that the driver is able to set different steering characteristics (sport, comfort, etc.) while operating the vehicle.

In the case of the embodiments according to FIGS. 12A-15, the ring 80 or the clips 82 serve for making it easier to produce steering systems limited to small angles of rotation between the two steering shaft sections 12, 14. These may, for example, be steering systems of sports vehicles in which high demands are made with regard to a particularly direct and precise steering action.

In order to mechanically limit the maximum angle of rotation 12, 14 to a small extent, the effective distance between the bending sections 28x and the side surfaces of the stop areas 24x, 26x has to be correspondingly small. This may bring about relatively great production effort if conventional tools are used. In this case, the webs 84 of the ring 80 or the clips 82 according to FIGS. 12A-15 serve as spacers that partially fill the free space in the cut-outs 16x—more specifically, of the axial cuts 18x, 22x of the cut-outs 16x. Thus, the effective width of the cut-outs 16x—more specifically, of the axial cuts 18x, 22x of the cut-outs 16x—and thus the maximum angle of rotation between the two steering shaft section 12, 14 is reduced. Different steering characteristics may also be obtained during the assembly of the steering system also in this case, by using rings 80 or clips 82 with webs 84 of different widths.

FIGS. 12A-12C show an embodiment of the ring 80 with the above-described webs 84 that serve as spacers for the limitation of the angle of rotation. FIGS. 13A and 13B show an embodiment of clips 82 that have a flange 86 perpendicular to the webs 84. The flange 86 of each clip 82 is located in the circumferentially extending cuts 20x of the cut-outs 16x and fixes the clip 82 in its axial position. In the embodiment according to FIGS. 14A and 14B, the clip 82 is reduced to a minimum. The clip 82 can be securely retained on the respective bending section 28x, for example by press fit. In the embodiment of FIG. 15, the clip 82 is disposed approximately in the center of the bending section 28A and serves as a stop for the four stop areas 24A, 24B, 26A and 26B.

The details shown in the above description and in the drawings are not to be considered a limitation of the scope of the invention, but examples of some embodiments of the invention. Other modifications are immediately apparent to the person skilled in the art. For example, features of the above-described embodiments may, for example, be combined with one another in order to obtain further embodiments of the invention. Accordingly, the scope of the invention is to be defined not by the above-described exemplary embodiments, but by the claims and their equivalents.

Some aspects of embodiments of the invention are defined in the following Enumerated Example Embodiments (EEEs):

EEE 1: Steering shaft component, comprising
  a first and a second steering shaft section comprising a common longitudinal axis,
  at least two bending sections separate from one another, wherein each of the bending sections substantially extends in the axial direction between the first and the second steering shaft sections and is disposed spaced from the common longitudinal axis, and
  at least two cut-outs, wherein each bending section is laterally adjacent to at least one of these cut-outs, respectively,
  characterized in that
  at least one of the cut-outs defines at least one stop area of one of the steering shaft sections which is configured to limit as a mechanical stop the maximum angle of rotation of the two steering shaft sections relative to each other.

EEE 2: Steering shaft component according to EEE 1, characterized in that the stop area is configured to come into contact with at least one bending section and/or the other steering shaft section in order to limit the maximum angle of rotation of the two steering shaft sections relative to each other.

EEE 3: Steering shaft component according to EEE 1 or EEE 2, characterized in that the at least one stop area is disposed, in the circumferential direction, next to at least one of the bending sections and/or next to at least one tab which is adjacent to one of the bending sections in the axial direction.

EEE 4: Steering shaft component according to any one of the EEEs 1 to 3, characterized in that each of the bending sections is subjected more to bending than to torsion during a rotation of the first steering shaft section relative to the second steering shaft section.

EEE 5: Steering shaft component, comprising
   a first and a second steering shaft section, and
   at least one first bending section extending between the first and the second steering shaft sections, wherein the first bending section is formed integrally with at least one of the steering shaft sections but has a different cross section from this steering shaft section,
   characterized in that at least one mechanical stop for limiting the maximum angle of rotation of the two steering shaft sections relative to each other is provided.

EEE 6: Steering shaft component according to EEE 5, characterized in that, furthermore, at least one second bending section is provided, wherein the second bending section is formed integrally with at least one of the steering shaft sections but has a different cross section from this steering shaft section.

EEE 7: Steering shaft component according to EEE 5 or EEE 6, characterized in that the first and the second steering shaft sections are arranged with a common longitudinal axis.

EEE 8: Steering shaft component according to EEE 7, characterized in that each of the bending sections substantially extends in the axial direction between the first and the second steering shaft sections and is disposed spaced from the common longitudinal axis.

EEE 9: Steering shaft component according to any one of the EEEs 1 to 8, characterized in that the first and the second steering shaft sections are configured in a tubular shape.

EEE 10: Steering shaft component according to any one of the EEEs 1 to 9, characterized in that each bending section is formed integrally with at least one of the steering shaft sections, respectively.

EEE 11: Steering shaft component according to any one of the EEEs 1 to 10, characterized in that at least one bending section is formed integrally with the two steering shaft sections.

EEE 12: Steering shaft component according to any one of the EEEs 1 to 11, characterized in that each bending section is laterally limited by at least one cut-out in the steering shaft component, respectively.

EEE 13: Steering shaft component, comprising
   a tubular first steering shaft section, and
   a tubular second steering shaft section, wherein
   the first and the second steering shaft sections are formed integrally with one another and have at least one cut-out that defines at least one bending section of the steering shaft component,
   characterized in that at least one mechanical stop for limiting the maximum angle of rotation of the two steering shaft sections relative to each other is provided.

EEE 14: Steering shaft component according to EEE 13, characterized in that each bending section extends between the first and the second steering shaft sections substantially in the longitudinal direction of the steering shaft component.

EEE 15: Steering shaft component according to any one of the EEEs 12 to 14, characterized in that at least two cut-outs are provided that define at least two bending sections.

EEE 16: Steering shaft component according to any one of the EEEs 12 to 14, characterized in that at least three cut-outs are provided that define at least three bending sections.

EEE 17: Steering shaft component according to any one of the EEEs 12 to 16, characterized in that the cut-out or at least one of the cut-outs is U-shaped or H-shaped.

EEE 18: Steering shaft component according to any one of the EEEs 12 to 17, characterized in that the two steering shaft sections are separated from each other by the cut-out(s) over a predominant part of their circumference.

EEE 19: Steering shaft component according to EEE 18, characterized in that the two steering shaft sections are separated from each other over more than 75% or more than 90% of their circumference.

EEE 20: Steering shaft component according to any one of the EEEs 1 to 19, characterized in that each bending section has a maximum width of at most 8 mm or at most 5 mm or at most 3 mm.

EEE 21: Steering shaft component according to any one of the EEEs 1 to 20, characterized in that each bending section has a length that is at least 5 times or at least 10 times of the maximum width of the bending section.

EEE 22: Steering shaft component according to any one of the EEEs 1 to 21, characterized in that at least one stop area of one of the steering shaft sections is configured to come into contact with at least one bending section and/or the other steering shaft section in order to limit the maximum angle of rotation of the two steering shaft sections relative to each other.

EEE 23: Steering shaft component according to EEE 22, characterized in that at least one stop area of one of the steering shaft sections is configured to come into contact with at least one tab of the other steering shaft section in order to limit the maximum angle of rotation of the two steering shaft sections relative to each other.

EEE 24: Steering shaft component according to EEE 22 or EEE 23, characterized in that the at least one stop area comprises at least one opening for lateral stop cushioning.

EEE 25: Steering shaft component according to EEE 24, characterized in that the at least one stop area comprises a plurality of openings with at least two different lengths for lateral stop cushioning.

EEE 26: Steering shaft component according to any one of the EEEs 1 to 25, characterized in that the first and the second steering shaft sections are disposed axially one behind the other.

EEE 27: Steering shaft component according to any one of the EEEs 1 to 26, characterized in that a pull-out protection means is provided which prevents the steering shaft sections from being pulled apart in the axial direction.

EEE 28: Steering shaft component according to EEE 27, characterized in that the pull-out protection is provided by at least one widened portion of one of the steering shaft sections or of a bending section reaching into a cut-out of the other steering shaft section.

EEE 29: Steering shaft component according to any one of the EEEs 1 to 28, characterized in that the two steering shaft sections have approximately the same external circumference at least in the area of the bending section or bending sections.

EEE 30: Steering shaft component according to any one of the EEEs 1 to 29, characterized in that the bending section or bending sections are configured to convert an applied steering force into a rotation of the first steering shaft section relative to the second steering shaft section.

EEE 31: Steering shaft component according to any one of the EEEs 1 to 30, further comprising an influencing device that reacts to a rotation of the first steering shaft section relative to the second steering shaft section.

EEE 32: Steering shaft component according to EEE 31, characterized in that the influencing device is a sensor or a valve.

EEE 33: Steering shaft component according to any one of the EEEs 1 to 32, characterized in that at least one fluid channel is incorporated into an external surface of one of the steering shaft sections.

EEE 34: Steering shaft component according to any one of the EEEs 1 to 33, further comprising at least one further component which comprises at least one web that reaches into one of the cut-outs between the bending sections and adjacent stop areas.

EEE 35: Steering shaft component according to EEE 34, characterized in that the at least one further component is a ring that encloses the steering shaft component in the circumferential direction.

EEE 36: Steering shaft component according to EEE 34 or EEE 35, characterized in that the stop area is configured to come into contact with at least one web of the at least one further component in order to limit the maximum angle of rotation of the two steering shaft sections relative to each other.

EEE 37: Steering shaft component according to any one of the EEEs 34 to 36, characterized in that the at least one web narrows the free space between the bending sections and the adjacent stop areas.

EEE 38: Steering shaft component according to EEE 34 or EEE 35, characterized in that the at least one further component is displaceable in the axial direction on the steering shaft component in order to obtain different steering characteristics.

EEE 39: Steering shaft, comprising a steering shaft component according to any one of the EEEs 1 to 38.

EEE 40: Method for producing a steering shaft component according to any one of the EEEs 1 to 38, wherein at least one cut-out is stamped into a flat metal workpiece, the stamped workpiece is rounded to form a tube, and the tube is welded together.

LIST OF REFERENCE NUMERALS

10 Steering shaft component
12 First steering shaft section
14 Second steering shaft section
16x Cut-out
18x First axial cut of the cut-out 16x
20x Circumferentially extending cut of the cut-out 16x
22x Second axial cut of the cut-out 16x
24x Stop area of the first shaft section 12
26x Stop area of the second shaft section 14
28x Bending section
30 Pinion
32 Connector
34, 36 Bearing
38 Influencing device
40, 42 Magnetic ring
44 Sensor
46, 48 Flange
50 Outer sleeve of the rotary slide valve
52 Inlets and outlets for hydraulic fluid
54 Fluid channel
56x Tab
58x Recess
60 Widened portion
62 Web
64x Groove
66x End portion
68x, 70x, 72x Cut-out for cushioning the lateral stopping impact
74x, 76x, 78x Tongues in FIG. 6A and FIG. 6B
77x Additional tongue in FIG. 7
80 Ring
82 Clip
84 Web
86 Flange

The invention claimed is:

1. A vehicle steering shaft component, comprising:
a first and a second steering shaft section comprising a common longitudinal axis;
at least two bending sections separate from one another, wherein each of the at least two bending sections substantially extends in the axial direction between the first and the second steering shaft sections and is disposed spaced from the common longitudinal axis; and
at least two cut-outs, wherein each bending section is laterally adjacent to at least one of these at least two cut-outs, respectively;
wherein at least one of the at least two cut-outs defines at least one stop area that is part of one of the first and second steering shaft sections;
wherein the at least one stop area limits, as a mechanical stop, the angle of rotation of the first and second steering shaft sections relative to each other around the common longitudinal axis to a predefined maximum angle of rotation;
wherein the predefined maximum angle of rotation is less than 10°.

2. The vehicle steering shaft component according to claim 1, wherein the at least one stop area that is part of one of the first and second steering shaft sections is configured to come into contact with at least one of the at least two bending sections and/or with the other one of the first and second steering shaft sections in order to limit the angle of rotation of the first and second steering shaft sections relative to each other around the common longitudinal axis to the predefined maximum angle of rotation.

3. The vehicle steering shaft component according to claim 1, wherein the at least one stop area is disposed, in the circumferential direction, next to at least one of the at least two bending sections and/or next to at least one tab which is axially adjacent to one of the at least two bending sections.

4. The vehicle steering shaft component according to claim 1, wherein each of the at least two bending sections is subjected more to bending than to torsion during a rotation of the first steering shaft section relative to the second steering shaft section.

5. A vehicle steering shaft component, comprising:
a first and a second steering shaft section comprising a common longitudinal axis;
at least one bending section extending between the first and the second steering shaft sections, wherein the at least one bending section is formed integrally with at least one of the first and second steering shaft sections but has a different cross section from this at least one steering shaft section;
a first and a second steering shaft section comprising a common longitudinal axis;
at least one bending section extending between the first and the second steering shaft sections, wherein the at least one bending section is formed integrally with at least one of the first and second steering shaft sections but has a different cross section from this at least one steering shaft section;

a first and a second magnetic ring; and a sensor;

wherein at least one of the first and second steering shaft sections comprises at least one stop area that is configured to come into contact with the at least one bending section and/or with the other one of the first and second steering shaft sections for limiting the angle of rotation of the first and second steering shaft sections relative to each other around the common longitudinal axis to a predefined maximum angle of rotation;

wherein the predefined maximum angle of rotation is less than 10°;

wherein the first magnetic ring is non-rotatably connected to the first steering shaft section;

wherein the second magnetic ring is non-rotatably connected to the second steering shaft section; and wherein the sensor is adapted to determine a rotation of the magnetic rings relative to each other around the common longitudinal axis, and to generate an electrical signal that indicates the determined rotation.

6. The vehicle steering shaft component according to claim 1, wherein the first and the second steering shaft sections are configured in a tubular shape.

7. The vehicle steering shaft component according to claim 1, wherein each of the at least two bending sections is formed integrally with at least one of the first and second steering shaft sections, respectively.

8. The vehicle steering shaft component according to claim 1, wherein at least one of the at least two bending sections is formed integrally with the first and second steering shaft sections.

9. The vehicle steering shaft component according to claim 5, wherein the at least one bending section is laterally limited by at least one cut-out in said vehicle steering shaft component.

10. A vehicle steering shaft component, comprising:

a tubular first steering shaft section and a tubular second steering shaft section comprising a common longitudinal axis;

wherein the first and the second steering shaft sections have at least one cut-out that defines at least one bending section of said vehicle steering shaft component;

wherein said vehicle steering shaft component further comprises at least one stop area that limits, as a mechanical stop, the angle of rotation of the first and second steering shaft sections relative to each other around the common longitudinal axis to a predefined maximum angle of rotation;

wherein the predefined maximum angle of rotation is less than 10°;

wherein said vehicle steering shaft component is a steering spindle with a first spindle end and a second spindle end;

wherein the first spindle end is formed into a connector for a steering column or for a cross joint;

wherein the second spindle end is formed into a pinion or a carrier on which a pinion is arranged; and wherein the first spindle end, the first steering shaft section, the at least one bending section, the second steering shaft section and the second spindle end are all formed integrally with each other.

11. The vehicle steering shaft component according to claim 1, wherein each of the at least two bending sections has a maximum width of at most 3 mm.

12. The vehicle steering shaft component according to claim 1, wherein each of the at least two bending sections has a length that is at least 5 times the maximum width of the bending section.

13. The vehicle steering shaft component according to claim 10, wherein the at least one stop area is configured to come into contact with at least one of the at least one bending section and/or with at least one of the first and second steering shaft sections, in order to limit the maximum angle of rotation of the first and second steering shaft sections relative to each other.

14. The vehicle steering shaft component according to claim 1, wherein a pull-out protection is provided which prevents the first and second steering shaft sections from being pulled apart in the axial direction.

15. The vehicle steering shaft component according to claim 1, wherein the first and second steering shaft sections have approximately the same external circumference at least in the area of the at least two bending sections.

16. The vehicle steering shaft component according to claim 1, further comprising an influencing device that reacts to a rotation of the first steering shaft section relative to the second steering shaft section.

17. The vehicle steering shaft component according to claim 1, further comprising at least one further component which comprises at least one web that reaches into one of the at least two cut-outs between the at least two bending sections and an adjacent one of the at least one stop area.

18. The vehicle steering shaft component according to claim 17, wherein the at least one further component is a ring that encloses the said vehicle steering shaft component in the circumferential direction.

19. A vehicle steering shaft component, comprising:

a first and a second steering shaft section comprising a common longitudinal axis; and at least one bending section extending between the first and the second steering shaft sections, wherein the at least one bending section is formed integrally with at least one of the first and second steering shaft sections but has a different cross section from this at least one steering shaft section; and an outer sleeve with at least one inlet and at least one outlet for hydraulic fluid;

wherein at least one of the first and second steering shaft sections comprises at least one stop area that is configured to come into contact with the at least one bending section and/or with the other one of the first and second steering shaft sections for limiting the maximum angle of rotation of the first and second steering shaft sections relative to each other around the common longitudinal axis to a predefined maximum angle of rotation;

wherein the predefined maximum angle of rotation is less than 10°;

wherein the first steering shaft section comprises at least one first fluid channel;

wherein the second steering shaft section comprises at least one second fluid channel; and wherein the outer sleeve and the at least one first fluid channel and the at least one second fluid channel form a rotary slide valve in which rotation of the first and second steering shaft sections relative to each other around the common longitudinal axis is adapted to control the throughput of hydraulic fluid from the at least one inlet of the outer sleeve to the at least one outlet of the outer sleeve.

\* \* \* \* \*